Dec. 1, 1925.

A. J. ROWLAND 1,564,138

TESTING APPARATUS

Filed March 12, 1923

2 Sheets-Sheet 1

WITNESSES
M. E. Downey
E. L. Naal

INVENTOR
Arthur J. Rowland,
By R. S. Caldwell
ATTORNEY

Dec. 1, 1925.

A. J. ROWLAND 1,564,138

TESTING APPARATUS

Filed March 12, 1923      2 Sheets-Sheet 2

WITNESSES
M. E. Downey
C. L. Haal

INVENTOR
Arthur J. Rowland,
By R. S. Rowland
ATTORNEY

Patented Dec. 1, 1925.

1,564,138

UNITED STATES PATENT OFFICE.

ARTHUR J. ROWLAND, OF MILWAUKEE, WISCONSIN, ASSIGNOR TO THE NORTH AMERICAN COMPANY, OF NEW YORK, N. Y., A CORPORATION OF NEW JERSEY.

TESTING APPARATUS.

Application filed March 12, 1923. Serial No. 624,545.

*To all whom it may concern:*

Be it known that I, ARTHUR J. ROWLAND, a citizen of the United States, and resident of Milwaukee, in the county of Milwaukee and State of Wisconsin, have invented new and useful Improvements in Testing Apparatus, of which the following is a description, reference being had to the accompanying drawings, which are a part of this specification.

The invention relates to testing apparatus, and more particularly to one used for testing the ability of an applicant to respond to certain signals or lack of signals, with a view of selecting men capable of driving mechanically propelled vehicles, such as street-cars. The apparatus is designed to determine the following qualities of the person being tested: his power of observation; his alertness of attention; his persistence in attention; his trainability in motor response; his ability to make selective response; and his planfulness and judgment in specific matters relating particularly to those which arise under usual running conditions. It also, to some extent, determines whether a man stays cool and calm under somewhat trying conditions such as might be met with in emergencies.

The invention further consists in the several features hereinafter set forth and more particularly defined by claims at the conclusion hereof.

Figure 1:
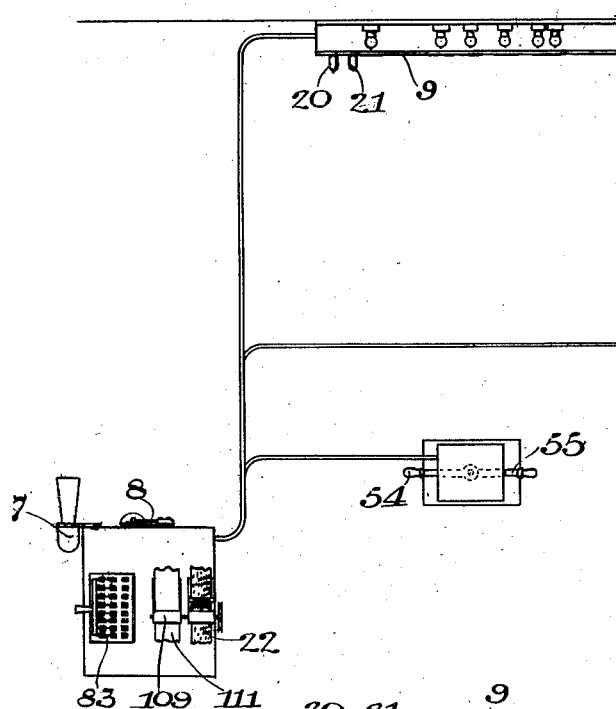
Figure 2:
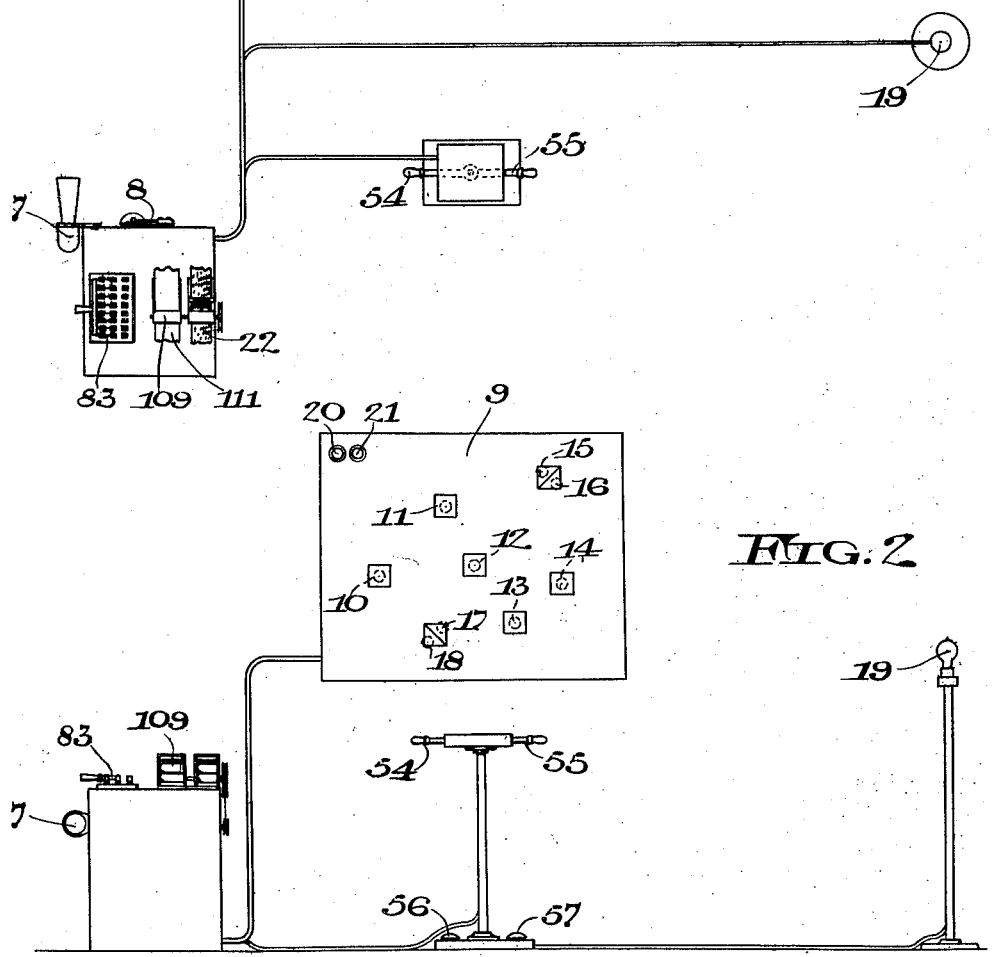
Figure 3:
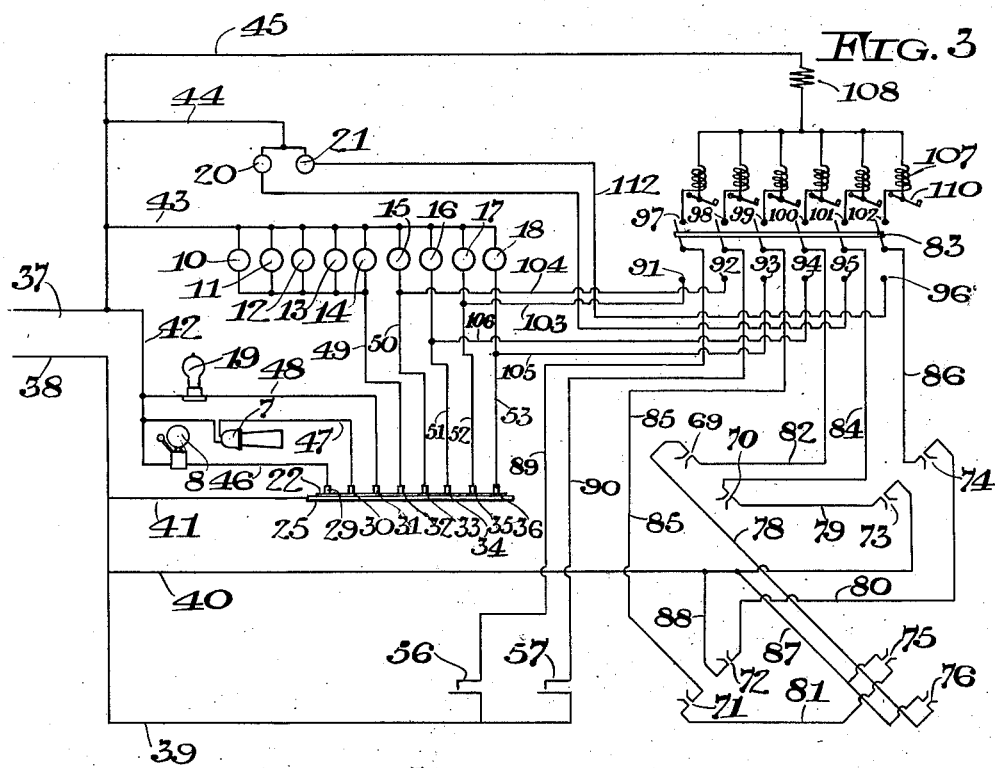
Figure 4:
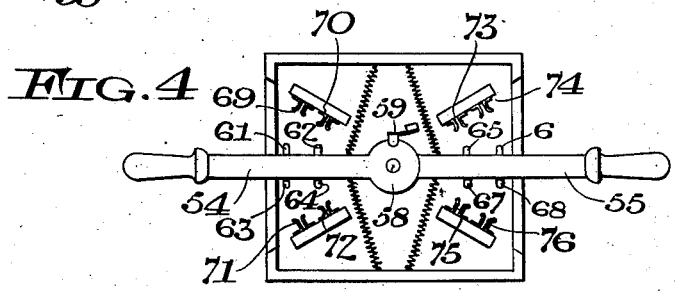
Figure 5:
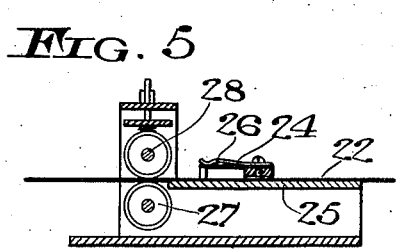
Figure 6:
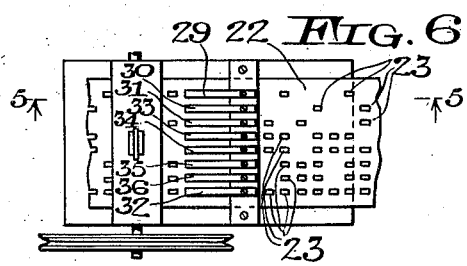

In the drawings: Fig. 1 is a plan view of an apparatus embodying the invention; Fig. 2 is a side elevation view thereof; Fig. 3 is a schematic view of the electrical system; Fig. 4 is a detail view of the reaction-board; Fig. 5 is a detail view taken on the line 5—5 of Fig. 6; Fig. 6 is a detail view of the signal control.

In general the device includes a plurality of audible and visible signals, means for automatically and selectively controlling the operation of said signals to indicate the response required, a reaction-board or switch mechanism operable by the applicant being tested in making his response, and means for indicating and recording the response of the applicant or person being tested.

Referring to the drawings, a horn 7, of the electrically-operated automobile type, and a gong or bell 8 are used to produce audible signals, and a signal-board 9 is provided with a plurality of apertures and with lights 10, 11, 12, 13, 14, 15, 16, 17 and 18 behind these apertures, as illustrated in Fig. 2, such lights being arranged in suitable compartments (not shown) behind the board for selective display. Another light 19, termed a distracting light, is movable to different positions and serves to exert a disconcerting influence on the subject under test by which his attention may be divided and his response affected. A like influence is also produced by the audible signals. There are also training lights 20 and 21 adjacent one corner of the board, which co-ordinate with the applicant's response to the audible signals during the training period.

The means for automatically and selectively controlling the operation of the signals may be of any suitable construction and is here shown in the form of a movable sending record or roll 22 having openings 23 therein and a plurality of circuit closers 24 adapted to make contact with a common conductor plate 25 when permitted to do so by the openings in the roll. More specifically these closers include a contact finger urged by a spring 26 adjacent the surface of the roll 22 and consequently against the plate 25 when the open spaces formed by the openings in the roll come under said fingers. The record is moved along and over the plate 25 by mounting it between a driven roller 27 and a yieldingly mounted roller 28, the roller 27 being driven from any suitable source of power, as by an electric motor (not shown).

For the purpose of explaining the circuit connections the contact fingers are designated 29, 30, 31, 32, 33, 34, 35 and 36. In the drawings the numerals 37 and 38 designate current supply conductors, and 39, 40, 41, 42, 43, 44 and 45 branch conductors. The bell 8 is in circuit with a conductor 46 leading from conductor 42 to contact 29, the horn 7 is in circuit with a conductor 47 leading from conductor 42 to contact 30, and the light 19 is in circuit with a conductor 48 leading from conductor 42 to contact 31. The lamps 10, 11, 12, 13 and 14 are across the conductors 43 and 49, the conductor 49 leading to the contact 32. The lamp 15 is in circuit with conductor 43 and a conductor 50 leading to the contact 33. The lamp 16 is in circuit with conductor 43 and a conductor 51 leading to the contact 34. The lamp 17 is in circuit with conductor 43 and a conductor 52 leading to the contact 35 and the lamp 18 is in circuit with conductor 43 and a conductor 53 leading to the contact 36. Fig. 6 shows the way the contacts are arranged and the diagram shows a somewhat different arrangement of the contacts in order to prevent crossing of wires. As previously stated, the plate 25 is a common return and is connected by conductor 41 to the supply line 38, and as the conductors 46 to 53, inclusive, are connected to the conductor 37 it will be noted that when one of the contact fingers is in contact with the plate a circuit is established and the record roll determines how many and what contact fingers are brought into action at any one time. Thus the travelling record is a means for selectively controlling the contacts so that either the bell 8, horn 7, light 19, bank of lights 10, 11, 12, 13 and 14, or the individual lights 15, 16, 17 and 18 may be operated. It will be noted from Fig. 6 that openings forming the different combinations are arranged in groups for successive display of different combinations of signals.

As designed, the roll provides for flashing the bank of lights 10, 11, 12, 13 and 14 in each instance, but the lights 15, 16, 17 and 18 are selectively flashed by the record roll and the person being tested is required to execute certain movements to effect the closing of a circuit or circuits for the light or lights not flashed by the roll. The person being tested is also required to execute certain movements when either the horn 7 or the gong 8 is sounded. The person being tested executes these movements by the operation of what has been termed a reaction board or switch mechanism consisting of a pair of individually operable hand levers 54 and 55 and foot-operated circuit closers 56 and 57. Each of the levers 54 and 55 is pivotally mounted on a post 58 and normally held in inoperative position by means of a spring-pressed detent 59. The hand lever 54 carries bridging contacts 61, 62, 63 and 64 and the lever 55 carries similar bridging contacts 65, 66, 67 and 68. The contacts 61 to 64 are designed to cooperate respectively with pairs of relatively stationary resilient contacts 69, 70, 71 and 72 and the contacts 65 to 68 are designed to cooperate respectively with pairs of relatively stationary resilient contacts 73, 74, 75 and 76. One of each of the contacts 69 and 76, 70 and 73, 72 and 74, 71 and 75 are respectively connected in series by conductors 78, 79, 80 and 81. The other of the contacts 69 is connected by a conductor 82 to a double throw switch arm 83. The other of the contacts 70, 71 and 74 are respectively connected to the switch arm 83 by conductors 84, 85 and 86. The other one of the contacts 76 and 75 is connected by a conductor 87 with the conductor 40 and the other one of the contacts 72 is connected by a conductor 88 with the conductor 40. One of the switch contacts of the pedal switch 56 is connected by a conductor 89 to the switch arm 83 and one of the switch contacts of the pedal switch 57 is connected by a conductor 90 to the switch arm 83. The other member of the pedal switch 56 and the pedal switch 57 are respectively connected to the conductor 39. The switch arm 83, it will be noted, is composed of a series of switch elements to which the conductors 89, 90, 85, 82, 84 and 86 are respectively connected and which elements are adapted to respectively cooperate with fixed contacts 91, 92, 93, 94, 95 and 96 in one position of the switch arm and with fixed contacts 97, 98, 99, 100, 101 and 102 in another position of the switch arm. In the drawings the switch arm 83 has been shown in "off" position.

Contact 91 is connected by conductor 103 to conductor 52. Contact 92 is connected by conductor 104 to conductor 50. Contact 93 is connected by conductor 105 to conductor 53. Contact 94 is connected by conductor 106 to conductor 51. Contacts 95 and 96 are connected to lamps 20 and 21 respectively. Contacts 97 to 102 are each in circuit with a solenoid 107 and these solenoids are connected in parallel and to the conductor 45 which may include a resistance 108. These solenoids form a part of the automatic recorder 109 which also includes a type bar 110 operated by each solenoid to record upon an endless record strip 111 which is driven at the same speed as the record roll 22 and in a similar manner.

During the training period the switch arm 83 is thrown to bring its elements into contact with the contacts 91 to 96, inclusive, so that the person being tested may see the results of the execution of his movements, as by the lighting of the lamp 20 in response to the bell signal, the lighting of the lamp 21 in response to the horn signal, and in the lighting up of the lamps 15 to 18, inclusive, which were not flashed on by the record roll. After he has familiarized himself with the operation of the reaction board he is given a test to ascertain his ability to respond to the signals and during this test the switch arm 83 is thrown to bring its elements into contact with the contacts 97 to 102, inclusive, so that the movements of the person being tested are recorded but he does not know whether or not he has made the proper response because under these conditions the circuit connections between the recording device and the lamps 20, 21 and 15 to 18, are broken.

With the above construction, with the switch 83 set in the training position, forward swinging movement of lever 54 and rearward swinging movement of lever 55 will establish current flow through lamp 16; rearward swinging movement of lever 54 and forward swinging movement of lever 55 will establish current flow through lamp 21; swinging both levers 54 and 55 back establishes current flow through lamp 18; swinging both levers forward establishes current flow through lamp 20; operation of foot-circuit-closer 57 establishes current flow through lamp 15; and operation of foot-circuit-closer 56 establishes current flow through lamp 17. Thus, during the training period the person to be tested knows that he has made the correct response to the sounding of the horn or bell by the lighting of lamp 21 or lamp 20, and sees the lamps light up behind the signal-board in response to his operation of the levers 54 and 55 and the closers 56 and 57. During his final test the switch arm 83 is thrown to bring its elements in contact with the contacts 97 to 102 of the record device and then those lights which have flashed on the signal-board and the lamps 20 and 21 do not light, but his operation of the levers 54 and 55 and closers 56 and 57 is recorded by the automatic recorder through the closing of the circuit to the solenoids operating the type bars to make a record so as to record the responses. The recorded responses are then compared with the record roll to determine the person's standing. It will be noted that with the series connections above described a movement of both levers 54 and 55 is necessary to make a response.

What I claim as my invention is:

1. In a testing apparatus of the character described, the combination of means for indicating to the person being tested the response required, switch mechanism operable by said person for his response, electrically operated response-recording mechanism, means for visibly indicating to the person being tested his response during his training period, and means for rendering said visible response indicating means ineffective and for rendering said recording mechanism operative during the test period.

2. In a testing apparatus of the character described, the combination of a signal-board provided with electrically-operated visible signals, means for automatically and selectively controlling the operation of said signals to indicate to the person being tested the response required, switch mechanism operable by said person, electrically-operated response-recording mechanism, and means for placing said switch mechanism in circuit with said signals and the signal-board so that the person to be tested may see, during his training period, what response he has made and for placing said switch mechanism in circuit with said recording mechanism and out of circuit with said signals during his test.

3. In a testing apparatus of the class described, the combination of a signal-board provided with electrically-operated visible signals, means for automatically and selectively controlling the operation of said signals to indicate to the person being tested the response required, switch mechanism including a plurality of switches adapted to be connected in series for establishing response-effecting circuits, independently movable control members operatively connected to said switches and jointly operable by the person being tested to close said switches in series for making response, and means for indicating his response.

4. In a testing apparatus of the character described, the combination of a signal-board provided with electrically-operated visible signals, electrically-operated audible signals, means for automatically and selectively controlling the operation of said signals to indicate to the person being tested the response required, switch mechanism operable by said person, electrically-operated visible training signals to indicate the response to said audible signals, electrically-operated response-recording mechanism, and means for placing said switch mechanism in circuit with the visible signals on the signal-board and said training signals so that the person to be tested may see, during his training period, what response he has made and for placing said switch mechansm in circuit with said recording mechanism and out of circuit with said signals during his test.

In testimony whereof, I affix my signature.

ARTHUR J. ROWLAND.